United States Patent [19]

Umemoto et al.

[11] Patent Number: 4,783,772
[45] Date of Patent: Nov. 8, 1988

[54] WRISTWATCH WITH PRESSURE SENSOR

[75] Inventors: Toshio Umemoto; Toshio Hiruta, both of Tokyo; Hideo Uehara, Sayama; Masato Yamada, Tokyo; Kunikazu Mochida, Tokorozawa, all of Japan

[73] Assignee: Citizen Watch Co., Ltd., Tokyo, Japan

[21] Appl. No.: 165,361

[22] Filed: Feb. 29, 1988

Related U.S. Application Data

[63] Continuation of Ser. No. 840,790, Mar. 18, 1986, abandoned.

[30] Foreign Application Priority Data

Mar. 19, 1985 [JP] Japan ............................. 60-039107[U]
Sep. 26, 1985 [JP] Japan ............................. 60-213322
Sep. 26, 1985 [JP] Japan ............................. 60-213323

[51] Int. Cl.⁴ .................... G04B 47/06; G01L 9/00
[52] U.S. Cl. ........................................ 368/11; 73/754
[58] Field of Search ............... 368/10, 11, 71, 278, 368/294, 295; 73/291, 384, 386, 437, 753–754

[56] References Cited

U.S. PATENT DOCUMENTS

| | | | |
|---|---|---|---|
| 3,031,591 | 4/1962 | Cary et al. | 73/754 |
| 3,198,013 | 8/1965 | Erdely | 73/754 |
| 3,505,808 | 4/1970 | Eschle | 368/295 |
| 4,107,995 | 8/1978 | Ligman et al. | 73/753 |
| 4,109,140 | 8/1978 | Etra | 368/1 |
| 4,188,825 | 2/1980 | Farrar | 368/1 |
| 4,257,112 | 3/1981 | Hubner | 73/754 |
| 4,257,115 | 3/1981 | Hatuse et al. | 368/80 |
| 4,352,168 | 9/1982 | Anderson | 368/10 |
| 4,413,527 | 11/1983 | Sugiura et al. | 73/754 |
| 4,533,256 | 8/1985 | Ostendorf | 368/10 |

FOREIGN PATENT DOCUMENTS

| | | | |
|---|---|---|---|
| 53-144776 | 12/1978 | Japan | 368/71 |
| 55-22125 | 2/1980 | Japan | 74/754 |

Primary Examiner—Vit W. Miska
Attorney, Agent, or Firm—Finnegan, Henderson, Farabow, Garrett & Dunner

[57] ABSTRACT

An electronic diving wristwatch having a pressure sensing depth meter provided in a projection on a case of the watch without interferring with the existing crown, pushbuttons, etc. The depth meter has a piezoelectric type sensing element which produces electrical output in response to the water pressure. The output is converted to a water depth which is displayed in a digital display window of the watch.

18 Claims, 9 Drawing Sheets

WRISTWATCH WITH PRESSURE SENSOR

This application os a continuation of application Ser. No. 840,790, filed Mar 18, 1986, now abandoned.

BACKGROUND OF THE INVENTION

1. Field of the Invention

The present invention relates to an electronic wristwatch having a pressure sensor.

2. Description of the Related Art

A pressure sensor can be used as a depth or altitude meter. For example, a depth meter is an essential piece of equipment for divers. Various kinds of depth meters are available on the market. However, the depth meters are all separate items. Namely, there has been no scuba-diving or snorkeling wristwatch which has a depth meter integrally and functionally incorporated therein.

Known depth meters come in two types: a mechanical type, which can indicate the depth of diving but cannot perform other functions, such as recording of the diving time, warning of the diving time after a preset time elapses, and/or warning of the depth when deeper than a preset level, contributing to safe diving and an electronic type, which can also perform various functions such as those mentioned above. However, the electronic type depth meter is rather complex in construction which sometimes results in malfunctions during diving.

In providing a wristwatch which has a depth meter (or an altitude meter) integrally and functionally incorporated therein, it is very important to prevent the depth meter from interferring with the existing crown and existing pushbutton(s) for switching various functions provided on the periphery of a watch case and also to enable the indicated or displayed depth to be easily seen without decreasing the visible field of a dial of the watch. In addition to the above, since the depth meter senses pressure, the depth meter has to be able to correctly receive the pressure of the water, to fully resist it, and to be completely sealed so as not to allow the water and the water pressure to affect the internal movement, internal electronic devices, etc. of the watch.

SUMMARY OF THE INVENTION

The present invention aims at the provision of a wristwatch with a pressure sensor which does not interfere with external pushbuttons of the wristwatch, has a high pressure resistance, is highly sealed, and enables easy viewing of the measurement, particularly even in the water without substantially decreasing the visible field of the watch dial.

Another object of the present invention is to provide a wristwatch with a pressure sensor which can prevent entrance of foreign materials, such as dust or sand.

Still another object of the present invention is to provide a wristwatch with a depth meter which has various kinds of functions, such as displaying a diving time and/or a maximum diving depth memory, warning a preset depth and/or the diving time memory, etc. which can be simply selected by a diver.

In order to achieve the aforementioned objects, according to the present invention, there is provided a wristwatch having a case, and an internal module provided in the case, the module including means for displaying the time, wherein there is provided, as an improvement, a pressure sensor which is provided in the case and which is functionally connected to the module, means for detecting a depth or an altitude in response to the measurement of pressure by the pressure sensor, and means for displaying the detected depth or altitude.

BRIEF DESCRIPTION OF THE DRAWINGS

The invention will be described below in detail with reference accompanying drawings, in which.

DESCRIPTION OF THE PREFERRED EMBODIMENTS

The following embodiments are directed to a wristwatch with a pressure sensor used as a depth meter for diving. The present invention is, however, not limited thereto, and the wristwatch can be used as an altitude meter, for example, for climbing.

Figure 1:
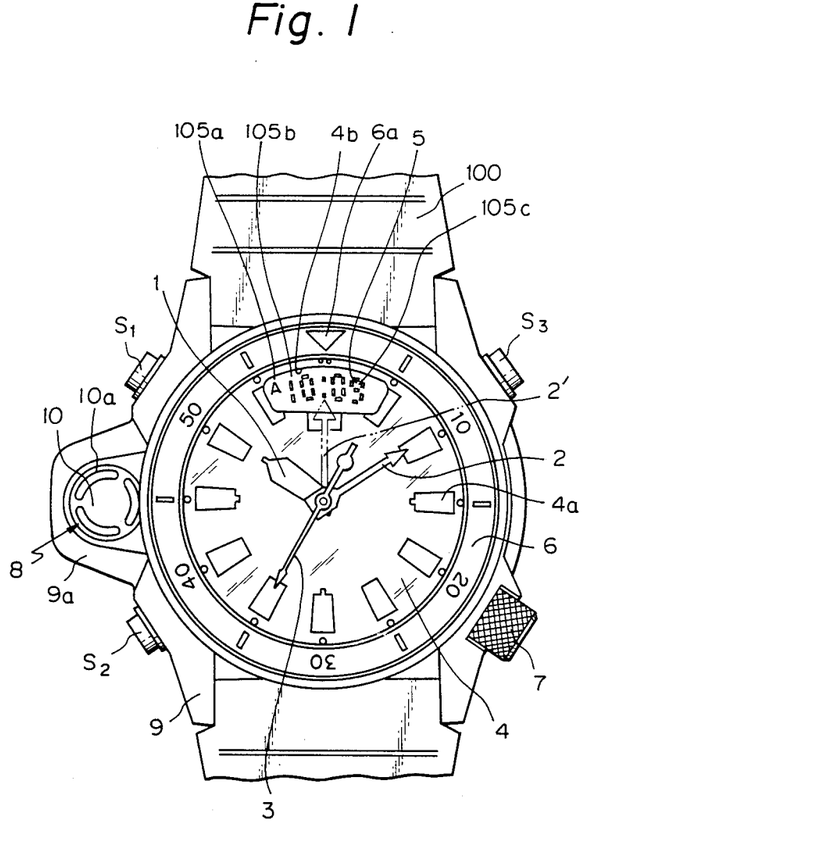
FIG. 1 is a front elevational view of a wristwatch with a pressure sensor according to the present invention.

Referring first to FIG. 1 which shows a wristwatch of the present invention, 1, 2, and 3 designate an hour hand, minute hand, and second hand, respectively. A dial 4 has 12 hour marks 4a corresponding for the hour hand 1 and a liquid crystal display (LCD) window 4b through which a liquid crystal cell 5 selectively indicating the time, the water pressure, alarm time, etc. is visible. A register ring (elapsed time bezel) 6 is provided around the dial 4 for rotation only in a counterclockwise direction relative to the dial 4 so as to preset the time in order to learn the elapsed time. Namely, the elapsed time can be understood by displacement of the minute hand after the zero mark 6a of the register ring 6 is set so that the mark 6a comes to the present position of the minute hand. Thus, the time can be easily seen within a circle defined by the register ring 6. A crown 7 is provided on the periphery of a case 9 of the watch to move the hands in order to adjust or correct the time.

In addition to the crown, which is an external actuation member, several external actuation pushbuttons S1, S2, and S3 are provided on the periphery of the case 9 for carrying out the change of display, i.e., display mode in the LCD window 4b, among the digital display of the time, digital display of the alarm at a preset depth of diving, a buzzer time at which the buzzer alarms, digital display of water pressure depending on the depth, etc.

A pressure sensor 8 is provided in a protective projection 9a of the case 9, which is located preferably in the vicinity of the mark 4a for nine o'clock between the pushbuttons S1 and S2.

The pressure sensor 8 is covered by a protective plate 10 in the form of a circular disc plate which has a plurality of archwise coaxial openings 10a equally spaced from one another in the circumferential direction of the protective plate 10. In the illustrated embodiment, there are three openings 10a, but the number thereof is not limited to three.

The location of the pressure sensor 8 in the vicinity of the mark 4a representing nine o'clock is preferable particularly for a right-handed diver who usually wears the watch on his left hand, because even when the diver bends his wrist outward, the protective projection 9a does not interfere with the back of the left hand.

Accordingly, if the wristwatch of the present invention is produced for a left-handed diver, the protective projection 9a and the pressure sensor 8 are preferably located in the vicinity of the mark 4a representing three o'clock, diametrically opposed to the illustrated arrangement.

Generally speaking, at least four external actuation members including the crown 7 and the three pushbuttons S1 to S3 are provided on the wristwatch with the pressure sensor. These are preferably arranged so that the two of the actuation members are diametrically opposed from the remaining two in a symmetrical fashion with respect to a center line connecting the 12 o'clock and six o'clock marks, along the directions connecting the mark 4a of two o'clock and the mark of eight o'clock and connecting the mark 4a of four o'clock and the mark 4a of 10 o'clock, respectively, in order to ensure easy operation of the actuation members. In addition, interference between the actuation members and a watchband 100 which usually extends in the direction connecting the marks 4a of 12 and six o'clock, has to be taken into account, in designing the location of the four actuation members. Under these circumstances, the pressure sensor 8 can be advantageously located between the two pushbuttons S1 and S2 on the left side of the watch and in the vicinity of the mark 4a of nine o'clock, as mentioned before.

In a wristwatch having only two pushbuttons besides the crown 7, as in the case of a wristwatch where either the pushbutton S1 or S2 is usually dispensed with, the pressure sensor 8 can be located at the location of the pushbutton S1 or S2 which does not exist.

In the illustrated embodiment, the wristwatch has an analog display including a dial 4 and a digital display including a liquid crystal cell 5 in the analog display. In FIG. 1, the time is nine past 10 and the second hand 3 points to 35 seconds.

The LC cell 5 consists of an AP indication portion 105a which indicates the morning (represented by A) or afternoon (represented by P), an hour indication portion 105b which indicates the hour, and a minute indication portion 105c which indicates the minute. In FIG. 1, the display of the LC cell 5 shows the time being 10:09.

The LCD window 4b is located on the mark 4a of 12 o'clock and also partially on the marks 4a of one and 11 o'clock. The latter two marks 4a are partly visible. The mark 4a of 12 o'clock is slightly displaced toward the center of the watch, so that the mark 4a which otherwise would be almost completely hidden by the LCD window 4b is visible, as can be seen from FIG. 1. Namely only the mark of 12 o'clock is slightly deviated inward in the radial direction from a circle on which the other 11 marks 4a are located. The LC cell 5 displays the hour and the minute along an arc of a circle substantially the same as the circle on which the 11 marks 4a are arranged.

The minute hand 2, which is longer than the hour hand 1, extends up to the vicinity of the numerals displayed in the LCD window 4b so as not to overlap the displayed numerals, as designated by an imaginary line 2' in FIG. 1, so that the minute hand 2 cannot obstruct the displayed numerals in the LCD window 4b. The deviated arrangement of the mark 4a of 12 o'clock and the length of the minute hand 2, which is short enough not to overlap the displayed numerals in the LCD window 4b, ensure that a diver can easily see the displayed values, such as the time, or depth, even in the water.

It should be noted that although the second hand 3 passes over the displayed numerals in the LCD window 4b, the movement of the second hand is fast and, accordingly, the problem of the hand obstructing the field of vision of the display can be withdrawn from consideration.

Figure 2:
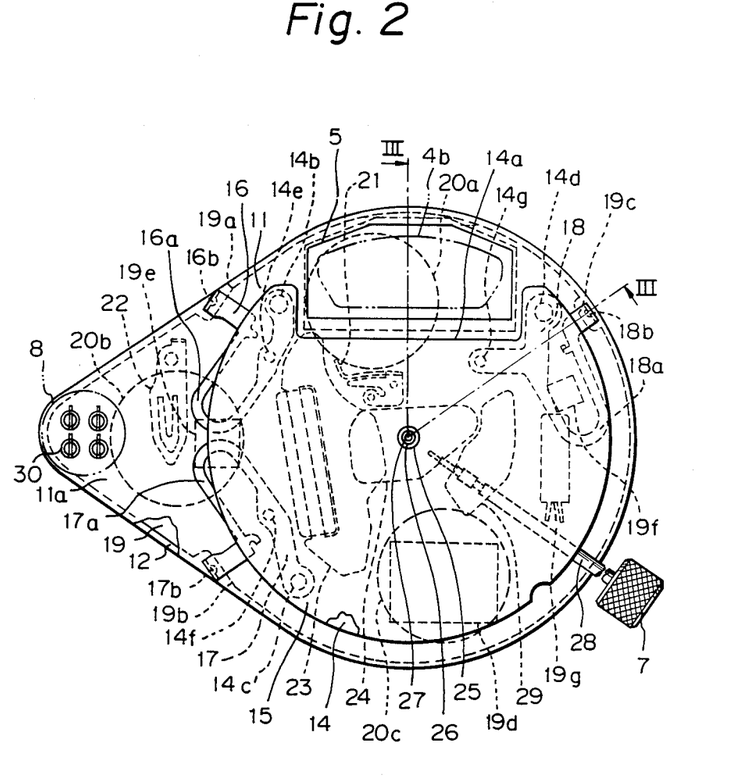
FIG. 2 is a plan view of an internal module of the wristwatch shown in FIG. 1.
Figure 3:
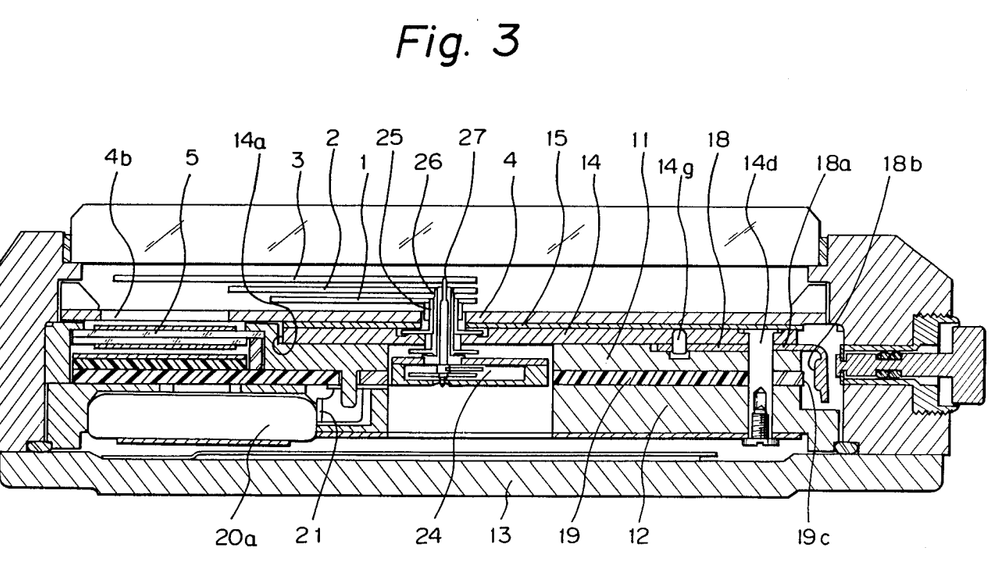
FIG. 3 is a sectional view taken along the line III—III in FIG. 2.

FIGS. 2 and 3 show a module of a wristwatch with a pressure sensor used as a depth meter of the present invention. In FIGS. 2 and 3, numeral 11 designates an oval-shaped support frame of LCD on the side of the dial 4, having a projection 11a in the vicinity of the mark of nine o'clock.

Under the LCD support frame 11 is provided an oval-shaped circuit support frame 12 which is also adapted to support the module (or movement) provided on the side of a back cover 13 of the wristwatch. On the LCD support frame 11 is provided a main plate 14 which is provided with an opening 14a in which the LC cell 5 is located. A magnetic shield plate 15 having a shape in plan view substantially the same as that of the main plate 14 is located between the main plate 14 and the dial 4.

The pushbuttons S1, S2, and S3 have respective return springs 16, 17, and 18 which are held on the main plate 14, with the help of respective tubes 14b, 14c, and 14d and positioning pins 14e, 14f and 14g which are secured to the main plate 14. When the pushbutton S1, S2, or S3 is pushed, the associated return spring 16, 17, or 18 elastically deforms at its spring portion 16a, 17a, or 18a, so that its contact portion 16b, 17b, or 18b comes into contact with an associated side through hole conductor pattern 19a, 19b, or 19c of a printed circuit board 19 on the circuit support frame 12. The printed circuit board 19 has an arithmetic IC 19d, an amplifying IC 19e, and a hand driving IC 19f. On the inner face of the back cover 13 are provided a crystal oscillator 19g soldered thereto and other soldered elements (not shown) so as not to interfere with flat type batteries 20a, 20b, 20c which are provided on the side of the printed circuit board 19 adjacent to the back cover 13. The batteries 20a and 20b are electrically connected in series to each other through a battery connecting conductor spring 21, the printed circuit board 19, and a battery receiving conductor spring 22. The hands are driven by a stepping motor 23. The stepping motor 23 drives a train wheel block 24 which rotates a hour wheel 25, a center wheel (minute wheel) 26, and a second wheel 27. The hour hand 1, the minute hand 2, and the second hand 3 are mounted at the upper ends of the hour wheel 25, the center wheel 26, and the second wheel 27, respectively.

The crown 7 is rigidly connected to a winding stem 28 which rotates the hands in order to adjust the time through a hand setting mechanism 29 per se known when the crown 7 is rotated after it is pulled.

The pressure sensor 8 is electrically connected to the printed circuit board 19, which extends by the projection 11a, by means of four coil springs 30.

As can be understood from the above discussion, the IC's or IC chips, batteries, soldered elements, hand setting mechanism, wheel train (blocks), etc., which are all necessary for performing various functions of a wristwatch, have to be compactly arranged in the space of the main plate 14.

Under these circumstances, it is very difficult to compactly arrange the pressure sensor 8 of the present invention in the area of the dial. This is the reason that the pressure sensor 8 is provided in the projection 11a of the module.

Figure 4:
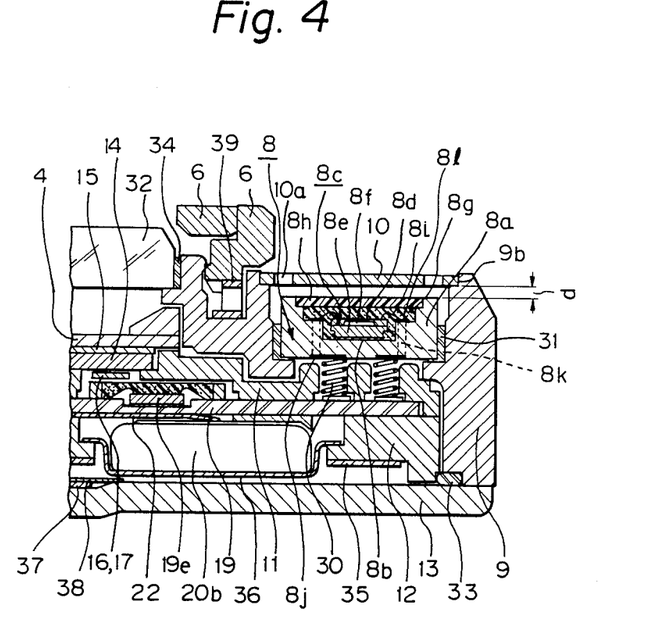
FIG. 4 is a partial sectional view of a wristwatch with a pressure sensor according to the present invention for particularly showing the pressure sensor portion.

With reference to FIG. 4 which shows a cross-section of a construction of the pressure sensor and its surroundings, the pressure sensor 8 comprises a ceramic package 8a in which a sensor chip block 8c is secured through an adhesive layer 8b of silicon resin which is adapted to absorb strain or deformation due to a difference in thermal expansion coefficients. The sensor chip block 8c is composed of a silicon chip 8d of a semiconductor pressure sensing element which has thereon four piezoresistances electrically interconnected in a bridge circuit (FIG. 5), and a heat-resistant glass 8e, such as Pyrex® which has a thermal expansion coefficient very similar to that of the silicon chip 8d. The silicon chip 8d is etched at its undersurface in the vicinity of the center thereof. The silicon chip 8d and the heat-resistant glass 8e are connected to each other, for example, by electrostatic bonding, so that a vacuum space 8f is provided therebetween. The internal pressure (vacuum) in the shape 8f is kept constant, regardless of changes in temperature.

The package 8a is filled with a gelled silicon resin 8g, which is a soft resin having a flowability in response to the change in pressure. The sensor chip block 8c is embedded in the silicon resin. On the silicon resin 8g is provided an upper layer 8h of silicon or rubber resin which is responsive to pressure change, so that external pressure, such as water pressure, can be reliably transmitted to the silicon chip 8d while ensuring protection against seawater or the like.

Namely, the change in pressure acting on the upper layer 8h of the pressure sensor 8 can be detected by the silicon chip 8d. The silicon chip 8d is electrically connected to electrodes 8j which are provided on the bottom face of the package 8a through conductor wires 8i extending between the chip 8d and conductor portions 8l of through holes 8k which are provided in the package 8a. The electrodes 8j, i.e., the conductor pattern portions of the bottom face of the package 8a, are electrically connected to the printed circuit board through the coil springs 30.

The pressure sensor 8 constructed above is press-fitted in the case 9 through a packing 31, so that the pressure which acts on the pressure sensor 8 can be received and absorbed by the case 9 through the packing 31 without the pressure acting on the elements of the module, such as the printed circuit board 19. This ensures high waterproofness and high pressure resistance of the wristwatch.

In order to prevent relatively large foreign matter, such as dust or sand, from coming into the pressure sensor 8, the protective plate 10 is provided above the pressure sensor 8. The protective plate 10 is rigidly connected to and in a recess 9b provided in the case 9.

The protective plate 10 is circular, as mentioned above, and has openings 10a (FIG. 1) which enable the water pressure to act on the upper layer 8h of the pressure sensor 8 therethrough. The openings 10a are provided as close as possible to the outer periphery of the protective plate, so that the openings 10a can be enlarged without increasing the width thereof. This arrangement of the openings 10a also contributes to prevention of the silicon chip 8d from being damaged, which otherwise would be damaged by insertion of something with a sharp end, such as a sharp pencil or ball pen. Those who wear the wristwatch may accidentally insert such a pencil or ball pen in the pressure sensor 8 through the openings 10a. In the illustrated embodiment, the openings are located above the package 8a, so that even if the sharp end is inserted in the openings 10a, it is not accessible to the silicon chip through the upper layer 8h and through the silicon resin 8g.

Between the upper layer 8h of the pressure sensor 8 and the protective plate 10 is provided a gap d which is determined taking into consideration the easy discharge of foreign matter coming into the gap d through the openings 10a with the help of flowing water, so gap d is not clogged with such foregin matter, in consideration two of the construction and the thickness of the case 9, etc. Preferably, the gap d is more than 200 μm. Otherwise, relatively small foreign matter which enters through the openings 10a tend to partially remain without being completely discharged, resulting in adhesion of foregin matter to the inner, i.e., bottom face of the protective plate 10 and to the upper, i.e., top face of the upper layer 8h after long time use. Furthermore, if the gap d is less than 200 μm, it is difficult to pass water through the openings 10a to clean the gap d, i.e., to expel foreign matter out from the gap d.

On the other hand, if the gap is more than 1000 μm, although clogging can be eliminated, the size, in particular the thickness, of the case 9 of the watch is increased as a whole. This is clearly contrary to the need for minimizing or decreasing the thickness of the watch. Accordingly, the dimensions of the gap are very important. It has been experimentally found that the gap is preferably within the range of 200 to 1000 μm, as mentioned above, in order to satisfy both the requirements of prevention of clogging of the gap with foreign matter and easy cleaning of the gap by passing cleaning water and of decreased thickness.

As can be easily understood from the above, the gap d should be as large as possible in the range mentioned above in order to decrease the possibility of clogging with the foreign matter.

Waterproof ring packings 33 and 34 are provided between the case 9 and the back cover 13 and between the case 9 and a glass 14.

In the module, the magnetic shield 15, the main plate 14, the LCD support frame 11, the printed circuit board 19, the circuit support 12, the circuit support plate 35 are put one below another from the bottom face of the dial 4. The circuit support plate 35 is maintained, together with the case 9, the back cover 13, and the main plate 14, at a reference voltage (Vdd).

In the vicinity of the flat type battery 20b, the switch return springs 16 and 17, the amplifying IC 19e, the printed circuit board 19, the battery receiving spring 22, the flat type battery 20b, and the battery clamp plate 36 are provided, in that order, from the bottom surface of the main plate 14. The battery 20b is secured to the circuit support 12 through the battery clamp plate 36.

The back cover 13 is provided, on the side facing the module, with a piezoelectric element 37 connected thereto. An insulation sheet 38 is connected to the piezoelectric element 37 for insulation from the batteries 20a, 20b, and 20c. The insulation sheet 38 also provides insulation between the battery 20a, which defines an electrode of an intermediate voltage at its surface adjacent to the back cover 13, and the back cover 13. The numeral 39 designates a register ring spring for preventing rotation of the register ring 6 in the clockwise direction. The register ring spring 39 is also adapted to ensure a moderate rotation of the register ring 6 in the counterclockwise direction. As can be seen from FIG. 4, the protective plate 10 is partially overlapped by the register ring 6, which is used to measure the diving time, when viewed from the plan view, so that the projecting length of the projection 9a of the case 9 can be decreased.

Figure 5:
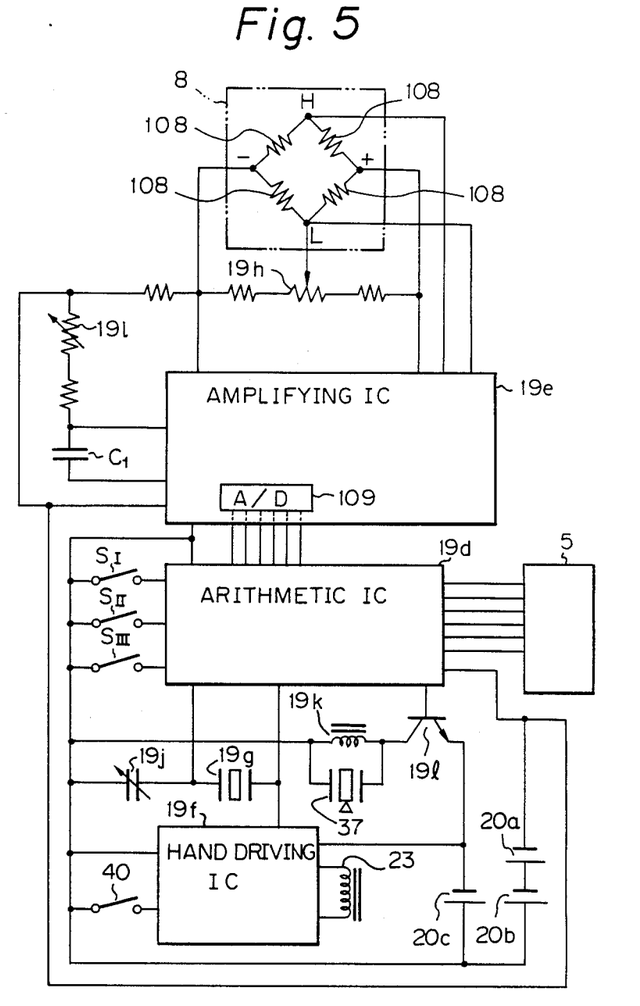
FIG. 5 is a diagram of a control circuit of a wristwatch shown in FIG. 1.

FIG. 5 shows the basic circuit of the wristwatch shown in FIG. 1. In the illustrated embodiment, the wristwatch has four IC chips, including the pressure sensor 8 (silicon chip 8d). The arithmetic IC 19d and the amplifying IC 19e, which includes an amplifying circuit and A/D converter 109, are supplied with 3V by two batteries 20a and 20b connected to each other in series. The hand driving IC 19f is supplied with 1.5V by the battery 20c. The pressure sensor 8 includes a bridge circuit consisting of four piezo resistances 108. The four terminals of the resistances are connected to the amplifying IC 19e. Between two (+and−terminals) of the terminals of the piezo resistances 108 is provided an offsetting trimmer resistance 19h for adjusting the output at a standard atmospheric pressure at a predetermined value. Resistances including a trimmer resistance 19i for adjusting the sensitivity of the amplifying IC 19e, and a condenser C1 are also provided.

In FIG. 5, S1, SII, and SIII designate switches which are made ON when the pushbuttons S1, S2, and S3 are pushed, respectively. The LC cells 5 are connected to the arithmetic IC 19d.

The numeral 19g is a crystal oscillator and 19j is a trimmer capacitor for adjusting the rate of the time. An alarm circuit is composed of an LC resonant circuit including a piezoelectric element 37 which forms a buzzer and a coil 19K which produces an increased voltage for driving the piezoelectric element 37, i.e., the buzzer, and of a transistor 19l which drives the resonant circuit. The alarm circuit is supplied with 1.5V by the battery 20c, in view of the balance of power consumption. The stepping motor 23 is connected to the hand driving IC 19f. The numeral 40 designates a reset switch which is made ON when the crown 7 is pulled to reset the hand driving IC 19f.

Figure 6:
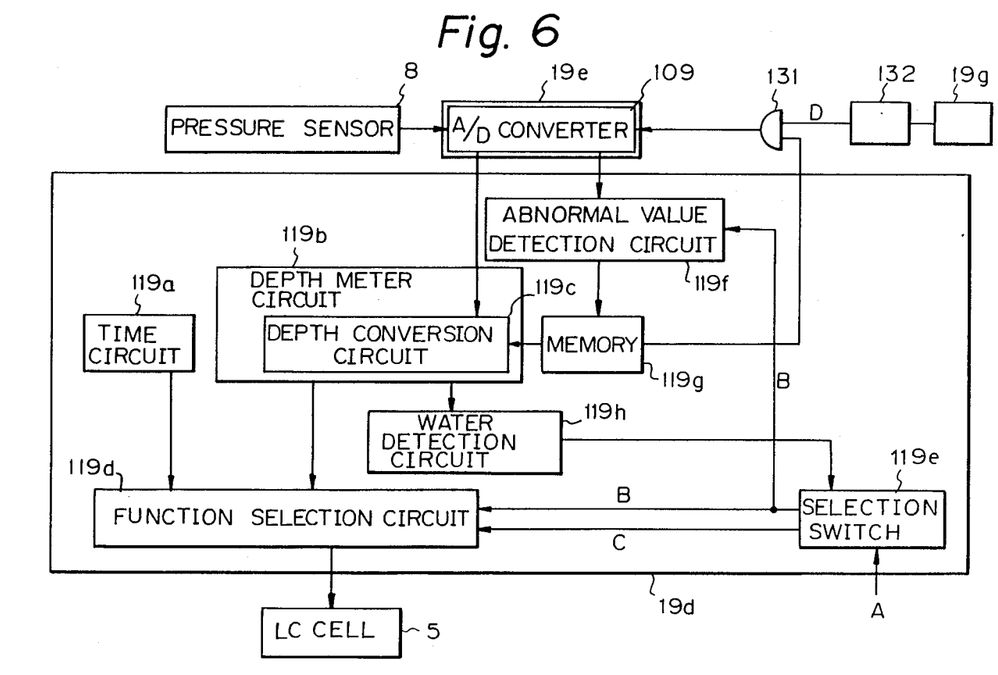
FIG. 6 is a block diagram for measuring depth (or altitude) according to the present invention.

FIG. 6 shows a block diagram of an embodiment of a pressure sensor which is used as a depth meter. The pressure sensor 8, in the form of a diaphragm type of semiconductor, issues analog signals to the amplifying IC 19e in response to the pressure on the pressure sensor 8. The output signals are converted to digital signals by the A/D converter 109 in the amplifying IC 19e. In the illustrated embodiment, the arithmetic IC 19d has a time circuit 119a performing time functions, such as display of the time ordate or issuing an alarm, as in an usual digital wristwatch, and a depth meter circuit 119b detecting the depth based on the measurement of the pressure by the pressure sensor 8. The time function or the depth function is selected by a function selection circuit 119d and is displayed by the LC cell 5. The function selection circuit 119d is actuated by a signal from a selection switch 119e. The time circuit 119a and the depth meter circuit 119b can be selectively displayed.

When the depth function is selected by the function selection circuit 119d, the depth is displayed in the LC cell 5 in response to the depth function selection signal B from the selection switch 119e. When the time function is selected, the time, date, etc. is displayed in the LC cell 5, in response to the time function selection signal C from the selection switch 119e. The selection switch 119e alternatively issues the signal B or C in response to a signal A which is input to the selection switch 119e every time the pushbuttons S1, S2, or S3 are actuated for a long period (a few seconds).

The signal B is also an initial pressure value setting signal. The signal B from the selection switch 119e is input into an abnormal value detection circuit 119f, whereupon the latter detects whether or not the pressure value to which the pressure measurement by the pressure sensor 8 is converted by the A/D converter 109 is abnormal. If the value is not abnormal, this value, which is called the initial pressure value, is stored in a memory 119g. On the contrary, if the detector 119f detects an abnormal value, the LC cell 5 displays it.

After the initial pressure value is stored in the memory 119g, the memory 119g opens a gate 131, so that the signal D which actuates the A/D converter 109 at a predetermined cycle passes through the gate 131. The signal D is fed from a clock signal generator 132 connected to the crystal oscillator 19g. The A/D converter 109 then converts the output from the pressure sensor 8 into a digital value which is input into depth conversion circuit 119c, in which a difference between the digital value and the above-mentioned initial pressure value is converted into a depth value which is then displayed in the LC cell 5.

The detection of an abnormal value is effected in the detection circuit 119f on the basis of the possible maximum variation in the atmospheric pressure for a long period and a total variation of input-output characteristics in the pressure sensor and the A/D converter due to aging. Namely, the detection circuit 119f detects abnormality due to trouble or failure of the system.

In FIG. 6, the numeral 119h designates a water detection circuit which detects whether or not the depth detected by the depth converter circuit 119c is positive.

When the depth value is positive, which means that the pressure sensor 8 is in the water, the selection switch 119e does not operate even if the signal A is input into the selection switch 119e by the actuation of the pushbutton S1, S2, or S3. That is, the time function cannot be selected in the water. This can be realized by the selection switch 119e which has therein means for prohibiting the issuance of output from the selection switch when the depth value is positive. Such a prohibiting means (circuit) is per se known. Accordingly, no signal B is issued, so that there is no possibility of reset of the initial pressure value by mistake by a diver.

The diver selects the depth functions before he dives, so that the variation of the atmospheric pressure, variation of the input-output characteristics due to aging of the pressure sensor and A/D converter, etc. can be automatically excluded and a correct or precise depth can be displayed in the water.

Figure 7:
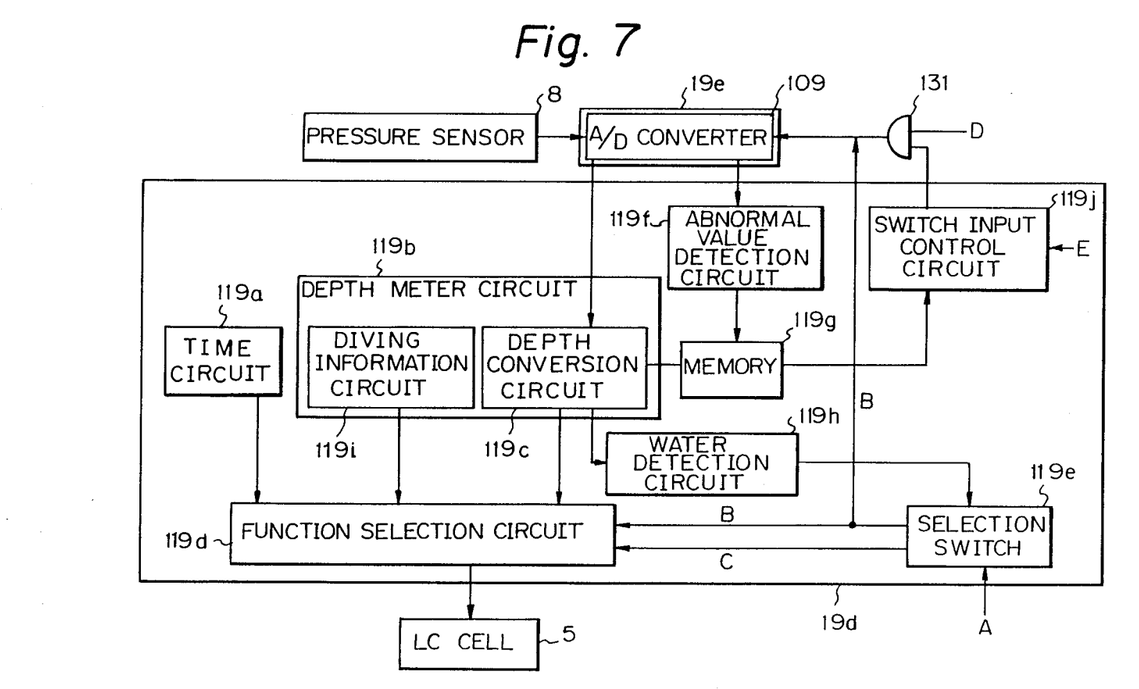
FIG. 7 is a block diagram for measuring depth (or altitude) according to another embodiment of the present invention.

FIG. 7 shows a block diagram of a second embodiment of the depth meter according to the present invention. In FIG. 7, the depth meter circuit 119b has a diving information circuit 119i besides the depth conversion circuit 119c. The diving information circuit 119i provides the "diving information function", i.e., buzzing when an actual depth is deeper than a preset depth of diving and other functions besides the depth indication.

When the time function is selected in the function selection circuit 119d, the signal B is issued from the selection switch 119e in response to the signal A, and the time is displayed in the LC cell 5. The signal B is also an initial pressure signal, as mentioned before. If the abnormal value detection circuit 119f detects that the initial pressure value is normal, it is stored in the memory 119g.

After the initial pressure value is stored in the memory 119g, a switch input control circuit 119j is activated to pass a depth measurement starting signal E from the pushbutton therethrough in order to open the gate 131. As a result of this, the A/D converter 109 is actuated to send the converted pressure value to the depth conversion circuit 119c, in which the difference between the converted pressure value and the initial pressure value is converted to a depth and the depth is displayed in the LC cell 5. The operation of the embodiment is similar to that of FIG. 6 except for the diving information circuit.

In the embodiment illustrated in FIG. 7, the diving information function is accessible under atmospheric pressure. The setting of the initial pressure value can be automatically effected by access also under atmospheric pressure, contributing to safe diving.

Furthermore, a diver does not always dive immediately after he selects the depth meter function. According to the present invention, since the depth conversion circuit is not activated until the switch input control circuit 119j receives the depth measurement starting signal, the power consumption can be decreased.

It should be noted that although it is impossible to correct the atmospheric pressure value during diving, since the diving time is usually not so long and since the variation of the atmospheric pressure in such a short time of diving is very small, the variation in the atmospheric pressure during diving is negligible.

Namely, the change in the atmospheric pressure during diving has almost no influence on the depth to be measured.

In the illustrated embodiments, though the initial pressure value is stored in the memory when the depth function is selected from the time function, the same effect can be also expected in any state other than depth function, including the state that nothing is displayed, in place of the time function.

Figure 8:
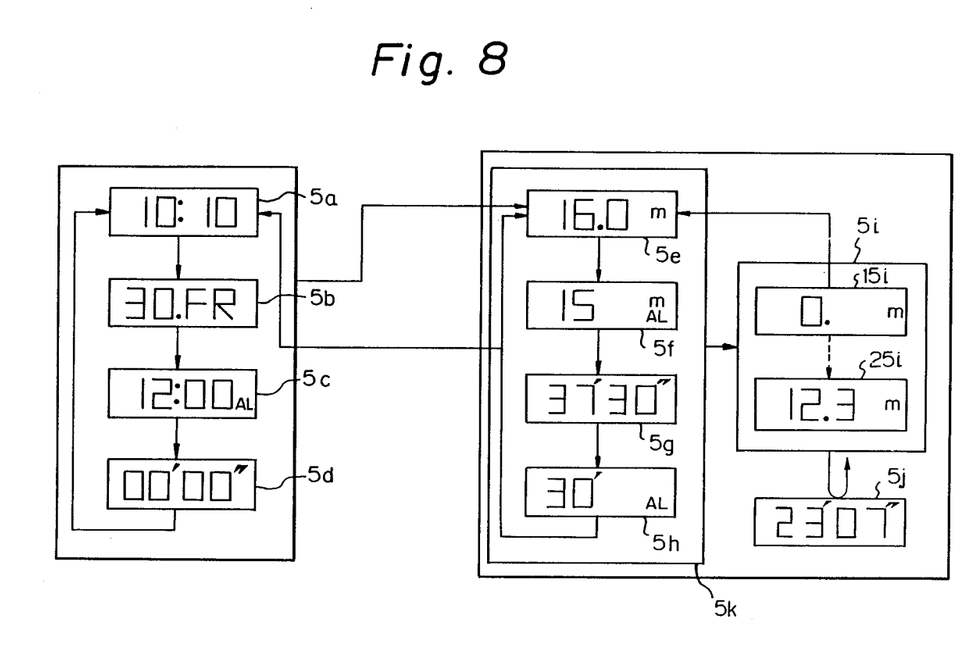
FIG. 8 is a schematic view of a digital display (or an altitude meter) of a wristwatch which can selectively display various kinds of numerical values according to the present invention.

FIG. 8 is a block diagram of the display of the LC cell 5. In FIG. 8 are shown different modes 5a to 5j of display in the time function and diving information, which will be described later. For example, when the pushbutton S2 is pushed for a few seconds, the display changes from the mode 5a to the mode 5b and then changes to the mode 5e, which designates the memorized deepest depth, which is one of the depth meter functions. The "memorized deepest depth" referred to means the deepest depth memorized in the preceding diving once before. Every time the pushbutton S2 is pushed for a short space of time for changing the mode of display, the display changes from the mode 5e to the mode 5f in which a diving depth alarm in which a buzzer sounds when the depth exceeds a preset depth is displayed, then to the mode 5g in which a recorded diving time is displayed, and then to the mode 5h in which a diving time alarm is displayed. When the diving time exceeds a preset time, the diving time alarm sounds. The display further returns to the mode 5e. From FIG. 8, it can be found that the deepest depth of diving was 16.0 m, the diving time was 37 minutes and 30 seconds, and the buzzer sounded at the depth of 15 m and at the diving time of 30 minutes. The set values of the alarm time and depth can be modified by the pushbutton S3.

When the pushbutton S1 is actuated in the course of the modes 5e to 5h in the diving information 5K to start the depth measurement, the display changes to the depth measurement display 5i from the diving information 5K. In the depth measurement display 5i, the display changes from the mode 15i in which 0 m is displayed to the mode 25i in which the depth of 12.3 m is displayed in response to the water pressure in the sea.

After diving, in order to change the display from the depth measurement display 5i to the deepest depth display mode 5e, etc., when the display is in the mode 15i of 0 m, the pushbutton S1 is pushed. At this time, the modes 5f, 5g, 5h are easily accessible as mentioned before.

In order to prevent the display from accidentally changing by erroneous operation of the pushbutton S1 during diving, the display does not change even when the pushbutton S1 is pushed in the water. However, while the pushbutton S3 is pushed, the diving time mode 5j is accessible even during diving. The change of the function from the depth function to the time function is effected by pushing, for example, the pushbutton S2 for a few seconds in the modes 5e to 5h, so that after the mode changes from the deepest depth mode 5e to the diving depth alarm mode 5f, the mode changes to the time mode 5a, just as with the change of the mode from the time function display to the depth function display.

It will be appreciated that additional information, such as descent rate and/or ascent rate, can be included in the diving information, so that if the actual diving or surfacing speed is greater than a preset diving or surfacing speed, the buzzer sounds.

In a block diagram of the change of display in the LC cell 5 shown in FIG. 8, when the pushbutton S2 is pushed for a short period, the display of the time mode successives changes from 5a to 5d. The mode 5a is the time display, the mode 5b is the date display, the mode 5c is the alarm time display, in which the buzzer sounds upon the preset alarm time, and the mode 5d is the stopwatch display. When the pushbutton S2 is actuated, the modes 5a to 5d repeat. In the time display shown in FIG. 8, when the pushbuttons S1 and S3 are actuated, the second of time appears. Correction of the time, date, and alarm time, setting and release of the alarm, starting and stopping of the stopwatch function and reset of the stopwatch, can be performed as in a usual digital wristwatch.

Figure 9:
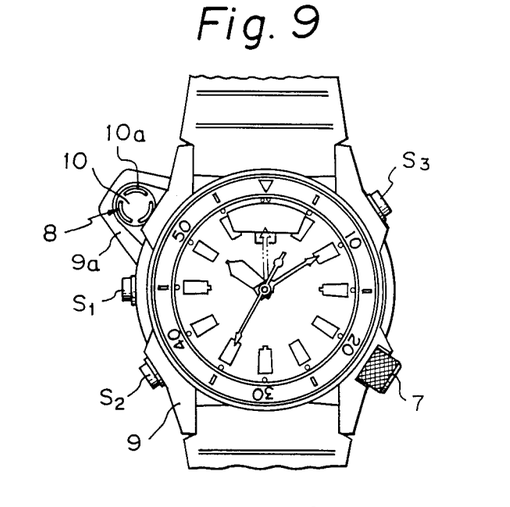
FIG. 9 whows a variant of FIG. 1, in which a pressure sensor is located in a different position.

FIG. 9 shows a different arrangement of the pressure sensor 8, in which the latter is located in the vicinity of the mark representing 10 o'clock. Namely, the push button S1 and the pressure sensor 8 shown in FIG. 1 are switched in their positions.

Figure 10:
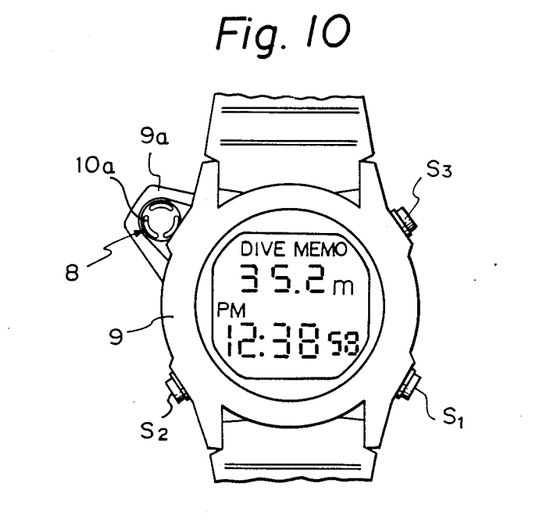
FIG. 10 is a schematic plan view of a digital wristwatch to which the present invention is applied.

FIG. 10 shows a different embodiment of the present invention applied to a digital wristwatch. In FIG. 9, the wristwatch has only digital display and does not have analog display elements, such as hands, 12 marks representing hours, etc. Since there is no crown for moving the hands in a digital wristwatch, the pressure sensor 8 of the present invention can be located for example, at the position of the pushbutton S1 of the wristwatch shown in FIG. 1, i.e., in the northwest direction in plan view. Furthermore, in the arrangement illustrated in FIG. 9, the crown 7 in FIG. 1 is replaced by the pushbutton S1. The various functions of the wristwatch shown in FIG. 9 are the same as those of the wristwatch shown in FIG. 1, mentioned above.

As can be understood from the above discussion, according to the present invention, a pressure sensor is provided, for example, in a projection provided on the wristwatch case adjacent to the nine o'clock mark. Accordingly, the pressure sensor does not decrease the visibility of the dial. The arrangement of the pressure sensor is advantageous, because the pressure sensor does not interfere with the back of the diver's hand when he wears the wristwatch on his left hand. As mentioned above, if the wristwatch is intended to be used for left-handed people, the pressure sensor can be advantageously provided on the wristwatch case adjacent to the three o'clock mark. The provision of the pressure sensor does not have any adverse influence on the conventional functions necessary for a digital or analog wristwatch.

The small gap between the protective plate 10 and the upper layer 8h of the pressure sensor 8 helps realize a thin wristwatch. In addition to the foregoing, the pressure sensor of the present invention can precisely detect the water pressure and can be protected from entry of foreign matter such as dust or sand. Even if foreign matter enters the pressure sensor, it can be easily removed therefrom by flushing with water.

The pressure sensor 8 has a sufficient pressure resistance and a water-sealed construction from the module of the wristwatch.

In the water, the actual pressure is a sum of the atmospheric pressure acting on the water surface and the weight of the water depending on the depth. The water depth h is given by the following formula:

h: actual water depth (m)
$\rho$: density of water (g/cm$^3$)
Ph: water pressure at h(m) of depth (atm)
Po: atmospheric pressure acting on the water surface (atm)

Exactly speaking, the density of sea water is slightly different from that of water. Accordingly, when the wristwatch of the present invention is used as a depth meter for sea diving, the density of the sea water is input and used in the arithmetic process of the detection. On the other hand, the atmospheric pressure is not always constant and can vary. According to the present invention, since the initial pressure preset is effected under the atmospheric pressure, namely before diving, the actual atmospheric pressure is introduced, resulting in precise detection of the depth.

Since the twelve o'clock mark is shifted away from the circle along which the other marks are arranged, the twelve o'clock mark is visible despite the LCD window. The location of the LCD window is not limited to the illustrated embodiment. It can be also located on the six o'clock, three o'clock, or nine o'clock marks. In such an alternative, the associated marks can be shifted slightly in the radial inward direction in comparison with the remaining marks. When the wristwatch is used as a depth meter, the depth can be clearly displayed in response to the water pressure without being influenced by the change in the atmospheric pressure and the change of the input-output characteristics in the pressure sensor and the IC chips in the electronic circuits provided in the wristwatch.

Various diving information can be included in the diving function. For example, a diving duration can be also recorded and displayed. Since the depth and various diving information can be displayed merely by actuating the associated pushbutton, the wristwatch is very advantageous for safety under the special environment of the sea.

We claim:

1. A wristwatch having a case, and an internal module provided in the case, said module comprising a face portion having means for displaying the time and detected depth or altitude, the improvement comprising a projection exending laterally from said face portion in a plane substantially normal to the axis of said face portion, a pressure sensor which is provided in said projection and which is functionally connected to the module, means for detecting a depth or an altitude in response to the measurement of pressure by the pressure sensor, means for displaying the detected depth or altitude, and a protective plate mounted in a major surface of said projection and defining gap within said projection between said protective plate and said pressure sensor, with said pressure sensor being located below said gap and opposite a center portion of said protective plate, said protective plate being provided with openings through which the pressure acts on the pressure sensing element, said openings being located in the vicinity of an outer periphery of the protective plate.

2. A wristwatch according to claim 1, wherein said module comprises a printed circuit board having a predetermined conductor pattern and electronic elements thereon for controlling said time displaying means and wherein said pressure sensor comprises means for receiving a pressure acting thereon and means for producing electrical output in response to the pressure and means for sending the output to the printed circuit board.

3. A wristwatch according to claim 2, wherein said pressure receiving means comprises a layer made of soft resin material responsive to the pressure acting thereon and wherein said electrical output producing means comprises a semiconductor pressure sensr element.

4. A wristwatch according to claim 3 wherein said pressure sensing element is embedded in a gelled resin on which a rubber upper layer is located.

5. A wristwatch according to claim 4, wherein said semiconductor pressure sensing element comprises a bridge circuit including four piezo resistances, the output of which changes in response to the change of the pressure acting thereon through the soft resin layer.

6. A wristwatch according to claim 2, further comprising means for sealing the pressure sensor from the module in a fluid-tight fashion.

7. A wristwatch according to claim 6, wherein the displaying means comprises a digital display portion and an analog display portion.

8. A wristwatch according to claim 7, further comprising means for selecting information to be displayed in the digital display portion.

9. A wristwatch according to claim 8, further comprising means for converting the output of the pressure sensor to a depth or an attitude of water.

10. A wristwatch according to claim 9, wherein the depth or altitude of water is displayed in the digital display portion.

11. A wristwatch according to claim 7, further comprising a dial having 12 marks in the case which represent the hours of time and wherein said digital display portion comprises a display window and a liquid crystal cell displaying the information, said display window partially overlapping at least one of the marks.

12. A wristwatch according to claim 11, further comprising a rotatable register ring around the 12 marks, said register ring being partially overlapped above the protective plate in plan view.

13. A wristwatch according to claim 11, wherein said at least one mark is partially shifted from the circle on which the remaining marks are located, so that the at least one marks which is overlapped by the display window is visible.

14. A wristwatch according to claim 1, wherein said projection is located in a vicinity of the mark representing nine o'clock.

15. A wristwatch according to claim 1, wherein said means for displaying the time comprises a digital display without analog display, and wherein said projection is located on the periphery of the case in the direction of around the northwest in plan view.

16. A wristwatch according to claim 1, further comprising a plurality of external actuation members provided on the case, including a crown for adjusting the time and pushbuttons for selecting the information to be displayed in the digital display portion.

17. A wristwatch according to claim 5, wherein said gap is within a range of approximately 200 to 1000 µm.

18. A wristwatch according to claim 11, wherein said analog display portion comprises an hour hand, a minute hand which is longer than the hour hand, and a second hand, said minute hand having a length that it does not extend up to displayed numerals in the liquid crystal cell in the display window.

* * * * *